Nov. 28, 1950  R. D. ACTON  2,532,050
FERTILIZER SPREADER
Filed March 19, 1945
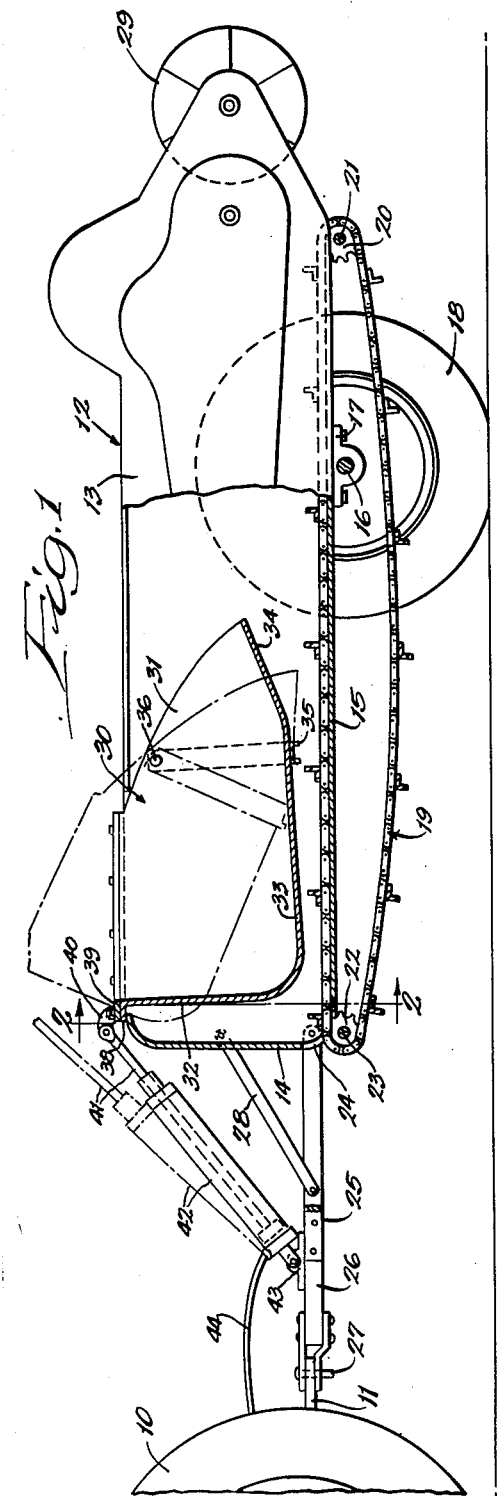
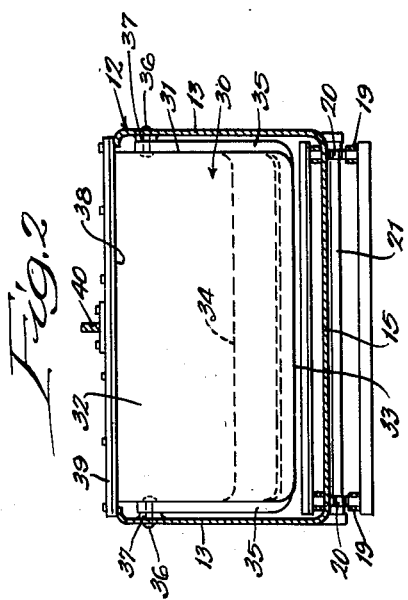
Inventor:
Russel D. Acton,
By Paul O. Pippel
Attorney.

Patented Nov. 28, 1950

2,532,050

UNITED STATES PATENT OFFICE 2,532,050

FERTILIZER SPREADER

Russel D. Acton, Chicago, Ill., assignor to International Harvester Company, a corporation of New Jersey Application March 19, 1945, Serial No. 583,454

5 Claims. (Cl. 275—5)

This invention relates to a fertilizer spreader. More particularly, it relates to a liquid-handling attachment for a manure spreader. Most of the manure spreaders heretofore known and used have been adapted only for handling manure in solid form. Agriculturalists are now stressing the value of the liquid portion of the fertilizer which ordinarily is lost. It is therefore desirable to provide a spreader which will be able to retain and distribute the liquid portion of the fertilizer. The Griffiths Patent 2,360,125, October 10, 1944, discloses and claims a liquid-tight body for a fertilizer spreader constructed so that the liquid may be transported and spread in the field. In addition to the use of this type of spreader, there are many instances where farmers already have a conventional spreader and desire some means to utilize it for hauling and spreading liquid fertilizer or particularly fertilizer having a significant percentage of liquid which would be lost in a conventional spreader.

The principal object of the present invention is to provide a fertilizer spreader particularly designed to handle manure containing a substantial quantity of liquid.

Another principal object is to provide an attachment for a conventional conveyor or apron type of manure spreader by means of which manure may be hauled and spread containing a substantial quantity of liquid without losing the valuable liquid component.

Other important objects and desirable features of the invention will become apparent to those skilled in the art as the disclosure is more fully made in the following detailed description and the accompanying drawings, in which, Figure 1 is a side elevation partly broken away in section to show the principal parts of the invention and their relationship to a spreader construction;

Figure 2 is a section taken on the line 2—2 of Figure 1.

As spreaders are ordinarily used in conjunction with tractors, the rear portion of a tractor is illustrated in the drawing, a traction wheel 10 and a draw-bar 11 being illustrated. The spreader consists essentially of an all-metal body designated in its entirety by the reference character 12, said body having side walls 13, a front end wall 14, and a bottom 15. An axle 16, supported at the bottom of the body by brackets 17, carries supporting wheels 18. A conventional slatted type of conveyor 19 is shown extending over the upper surface of the bottom 15, rearwardly over sprockets 20 on a supporting shaft 21, forwardly under the bottom 15 and over sprockets 22 carried on a supporting shaft 23 at the front end adjacent the front end 14 of the spreader body. An opening 24 is provided at the lower portion of said front end for passage of the conveyor. A draw-bar structure including side members 25, which are connected to the front ends of the sides 13 adjacent their bottom edges, and a draft member 26 to which said members are connected, is adapted to be pivotally connected, such as by a pin 27, to the draw-bar 11 of the tractor. Brace members 28 hold the draft structure rigidly with respect to the body 12 of the spreader.

A beater 29 is illustrated at the rear end of the spreader, it being understood that any conventional distributing mechanism may be used at the rear open end of the spreader body.

Up to this point the construction described is conventional. Manure is ordinarily loaded into the body of a spreader with the result that the liquid portions are drawn to the ends and are lost, particularly if the spreader is left in a standing position for any substantial length of time. Generally speaking, the liquid portion of the manure is not present in a very large percentage but its fertilizing value is such that its retention is very desirable. For this purpose a receptacle or container, designated in its entirety by the reference character 30, is mounted in the forward end of the spreader body, occupying a substantial portion of the body. Said receptacle has side walls 31, a front wall 32, a substantially horizontal bottom wall 33 slanting upwardly slightly from the forward end, and a retaining bottom wall portion 34 which slants at the open end of the receptacle sufficiently to provide a substantial liquid-containing capacity below the level of the open end. To support said receptacle, a channel shaped member 35 extending underneath the receptacle and upwardly at each side thereof is pivotally connected by pins 36 to brackets 37 mounted on the side walls 13. To further support the receptacle, the side walls 31 and the front wall 32 are provided with a horizontally extending flange 38 extending entirely around the upper edge of the receptacle. Said flange is secured to a U-shaped reinforcing bar 39 to give additional strength.

At the center portion of the rear of the combined flange 38 and bar 39, an upwardly and rearwardly extending bracket 40 is rigidly secured. Said bracket provides a means for pivotally connecting a piston rod 41 of a hydraulic device which includes a cylinder 42. Said cylinder is pivotally connected on an attaching bracket 43 rigidly secured to the draft member 26. A hose 44 is illustrated leading from the cylinder 42 of the tractor wheel. Any suitable source of fluid under pressure may be utilized for expanding the piston in the cylinder and tilting the receptacle 30 to the dotted-line position shown in Figure 1.

In utilizing the construction of this invention, the operator loads the spreader body throwing the more liquid portions of the manure in the front end with the more solid portions being loaded in the rear end. The liquid portions draining out of the front portion of the load are retained in the receptacle 30 because of the inclined bottom retaining wall 34. At any time during the spreading operation the operator from the tractor may tilt the receptacle by means of the hydraulic means, thereby pouring the liquid onto the spreader bottom from whence it is carried with the solid portions of the manure to the rear end and discharged thereby.

The receptacle is of a construction that it may be readily cleaned of accumulated materials. It may also be completely removed from the spreader merely by removing the pins 36 and the hydraulic cylinder from the bracket 40.

Applicant has shown and described one embodiment by which the objects of his invention may be accomplished. It is to be understood that all modifications falling within the scope of the appended claims are considered a part of this invention.

What is claimed is:

1. In combination with an apron type manure spreader having a body with a bottom, side walls, a front end wall and a conveyor, an attachment comprising a load-carrying container filling a substantial portion of the forward end of the spreader body, said container being pivotally mounted on the body, said container having an open rear end and a depressed, forwardly sloping bottom whereby it has a substantial capacity in one position to retain liquid material below the level of the open end, and means for tilting said container to dump the material therein onto the conveyor of the spreader.

2. In combination with an apron type manure spreader having a body with a bottom, side walls, a front end wall, and a conveyor operable on the bottom, an attachment comprising a container filling substantially the forward half of the spreader body, said container being pivotally mounted on a transverse axis at the sides of the body, said container extending substantially the entire width of the body and to the front end wall, said container having an open rear end and having a bottom extending below the level of the open end thereby providing a substantial capacity to retain liquid material below the level of the open end, and means connected to the front end of the container for tilting said container rearwardly to dump the material therein including the liquid onto the conveyor of the spreader.

3. In combination with an apron-type manure spreader having a body with a bottom, side walls, a front end wall, and a conveyor operable on the bottom, an attachment comprising a container filling substantially the forward half of the spreader body, said container being pivotally mounted on a transverse axis at the sides of the body, said container extending substantially the entire width of the body and to the front end wall and being provided with a horizontally extending flange adapted to rest on the top edge of the side walls and the end wall to support said container, said container having an open rear end and having a bottom extending below the level of the open end thereby providing a substantial capacity to retain liquid material below the level of the open end, and means connected to the front end of the container for tilting said container to dump the material therein including the liquid onto the conveyor of the spreader.

4. In combination with an apron-type manure spreader having a body with a bottom, side walls, a front end wall, and a conveyor operable on the bottom, an attachment comprising a container filling substantially the forward half of the spreader body, said container being pivotally mounted on a transverse axis at the sides of the body, said container extending substantially the entire width of the body and to the front end wall and being provided with a horizontally extending flange adapted to rest on the top edge of the side walls and the end wall to support said container, said container having an open rear end and having a bottom extending below the level of the open end thereby providing a substantial capacity to retain liquid material below the level of the open end, and power-actuated means including a hydraulic cylinder connected to the front end of the container for tilting said container to dump the material therein including the liquid onto the conveyor of the spreader.

5. In combination with a conveyor-type manure spreader adapted to be drawn by a tractor having a source of fluid under pressure thereon, said spreader having a wheel-supported body having a bottom, side walls, a front end wall and a draft frame structure extending forwardly from the body, an attachment comprising a load-carrying container filling substantially the forward half of the spreader body, said container having side walls lying adjacent the side walls of the body and pivotally connected on a transverse axis to the sides of the body, said container having a front wall supported on the front end wall of the body and an upwardly sloping bottom terminating to provide an open rear end for the container, whereby liquid material is retained below the opening, and power-actuated means including an expansible hydraulic device connected to the draft frame structure and the front wall of the container for tilting said container to dump the liquid material therein onto the conveyor of the spreader, said device being operable by fluid from the tractor whereby the container may be tilted during travel of the machine.

RUSSEL D. ACTON.

REFERENCES CITED

The following references are of record in the file of this patent:

UNITED STATES PATENTS

| Number | Name | Date |
|---|---|---|
| 9,535 | Hedges | Jan. 11, 1853 |
| 947,538 | Barrow | Jan. 25, 1910 |
| 951,073 | Hicks | Mar. 1, 1910 |
| 1,221,863 | Hunt | Apr. 10, 1917 |
| 2,239,029 | Barrett | Apr. 22, 1941 |
| 2,360,125 | Griffiths | Oct. 10, 1944 |